United States Patent
Kumar

(10) Patent No.: US 7,500,092 B2
(45) Date of Patent: Mar. 3, 2009

(54) HARDWARE ABSTRACTION FOR SET-TOP BOX OPERATING SYSTEMS

(75) Inventor: Vijay Kumar, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 10/347,030

(22) Filed: Jan. 17, 2003

(65) Prior Publication Data

US 2004/0143752 A1 Jul. 22, 2004

(51) Int. Cl.
G06F 9/00 (2006.01)

(52) U.S. Cl. ............................. 713/2; 713/1; 717/166; 717/173; 717/174

(58) Field of Classification Search ................ 713/1, 713/2; 717/174, 166, 173
See application file for complete search history.

(56) References Cited

U.S. PATENT DOCUMENTS

| | | | | |
|---|---|---|---|---|
| 5,373,288 | A | 12/1994 | Blahut | 340/825.08 |
| 5,586,324 | A * | 12/1996 | Sato et al. | 713/2 |
| 5,619,250 | A | 4/1997 | McClellan et al. | 348/10 |
| 5,666,293 | A | 9/1997 | Metz et al. | 395/200.5 |
| 5,951,639 | A | 9/1999 | MacInnis | 709/217 |
| 6,202,147 | B1 * | 3/2001 | Slaughter et al. | 713/1 |
| 6,393,560 | B1 * | 5/2002 | Merrill et al. | 713/2 |
| 6,393,585 | B1 | 5/2002 | Houha et al. | 714/23 |
| 6,636,961 | B1 * | 10/2003 | Braun et al. | 713/1 |
| 6,732,264 | B1 * | 5/2004 | Sun et al. | 713/2 |
| 6,832,381 | B1 * | 12/2004 | Mathur et al. | 719/328 |
| 2001/0052080 | A1 | 12/2001 | Dusenbury, Jr. | 713/201 |
| 2002/0024616 | A1 | 2/2002 | Kim | 348/714 |
| 2002/0099920 | A1 | 7/2002 | Shoji | 711/170 |
| 2002/0138592 | A1 | 9/2002 | Toft | 709/219 |

FOREIGN PATENT DOCUMENTS

| | | |
|---|---|---|
| EP | 0 907 285 A1 | 4/1999 |
| WO | WO 98/54642 | 12/1998 |
| WO | WO 00/64178 | 10/2000 |
| WO | WO 00/64179 | 10/2000 |
| WO | WO 00/64180 | 10/2000 |

* cited by examiner

Primary Examiner—Emmanuel L Moise
Assistant Examiner—Paul Callahan
(74) Attorney, Agent, or Firm—Ian MacKinnon; Hoffman Warnick LLC

(57) ABSTRACT

A standardized system for developing hardware platforms and operating systems for computer systems. The system comprises: (1) a first standardized protocol for developing hardware platforms, wherein the first standardized protocol requires each hardware platform to include a bios program having: a first system for setting up a plurality of control features on the hardware platform; and a second system for collecting a standardized set of abstraction information and storing the abstraction information in a standardized format; and (2) a second standardized protocol for developing operating systems, wherein the second standardized protocol: requires each operating system to include an interface call to obtain the abstraction information in the standardized format; and requires each operating system to be operational on a target hardware platform with the abstraction information.

5 Claims, 2 Drawing Sheets

HARDWARE ABSTRACTION FOR SET-TOP BOX OPERATING SYSTEMS

BACKGROUND OF THE INVENTION

1. Technical Field

The present invention relates generally to designing embedded systems, and more particularly relates to an interface protocol for simplifying the development of embedded systems.

2. Related Art

Effective development of embedded computer systems often requires hardware (i.e., a CPU and related control features) and software (i.e., the operating system, bios, etc.) to be developed simultaneously. This is particularly the case in fast moving technologies such as video processing where the demand for new features drives the need to quickly and regularly update and or redesign existing systems. One example of such a fast moving technology involves set-top boxes. A set-top box is a device that enables a television set to become a user interface to the Internet and also enables a television set to receive and decode digital television (DTV) broadcasts. A set-top box is necessary to television viewers who wish to use their current analog television sets to receive digital broadcasts. It is estimated that 35 million homes will use digital set-top boxes by the end of 2006, the estimated year ending the transition to DTV.

In an embedded system, an operating system is required to drive the operation of the hardware platform. In particular, present methodologies require the operating system to both provide a user interface and to "set-up" the control features associated with the hardware platform. Typical set-up operations include initializing clock registers, initializing external bus interface unit controllers and memory controllers, initializing general purpose I/Os, initializing xilinx configurations and cache configurations, loading and executing the operating system, etc. Accordingly, whenever a new hardware platform is developed, the operating system must know certain specific details of the hardware so that the set-up can be accomplished. However, because the operating system is often developed separately from the hardware, delays can be encountered, for instance, whenever design specifications change by either of the hardware or software developers.

Moreover, operating system code is generally not easily portable from one platform to another since it contains platform specific code. Accordingly, a need exists for a more standardized mechanism that will eliminate development delays when hardware and software are simultaneously developed.

SUMMARY OF THE INVENTION

The present invention addresses the above-mentioned problems, as well as others, by providing a standard interface protocol for hardware platforms and operating systems. In a first aspect, the invention provides a standardized method for developing an embedded system, comprising: providing a standardized set of abstraction data items; designing a hardware platform together with a bios program, wherein the hardware platform includes a processing unit and a set of control features, and wherein the bios program is stored in a read only memory and includes code for setting up the control features on the hardware platform and for collecting and storing abstraction data values in a standardized format; and designing an operating system that includes an interface call to obtain the abstraction data values, and wherein the operating system is designed to be operational on the hardware platform with the abstraction data values.

In a second aspect, the invention provides an embedded system, comprising: a hardware platform having a CPU and a set of control features; a bios program to be executed by the CPU upon system startup, wherein the bios program includes code for setting up the set of control features for the hardware platform and for collecting and storing a predefined set of abstraction data values; and an operating system having an interface call to obtain the abstraction data values, wherein the abstraction data values represents a minimum amount of information required from the hardware platform necessary to run the operating system on the hardware platform.

In a third aspect, the invention provides a standardized system for developing hardware platforms and operating systems for computer systems, comprising: (1) a first standardized protocol for developing hardware platforms, wherein the first standardized protocol requires each hardware platform to include a bios program having: a first system for setting up a plurality of control features on the hardware platform; and a second system for collecting a standardized set of abstraction information and storing the abstraction information in a standardized format; and (2) a second standardized protocol for developing operating systems, wherein the second standardized protocol: requires each operating system to include an interface call to obtain the abstraction information in the standardized format; and requires each operating system to be operational on a target hardware platform with the abstraction information.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
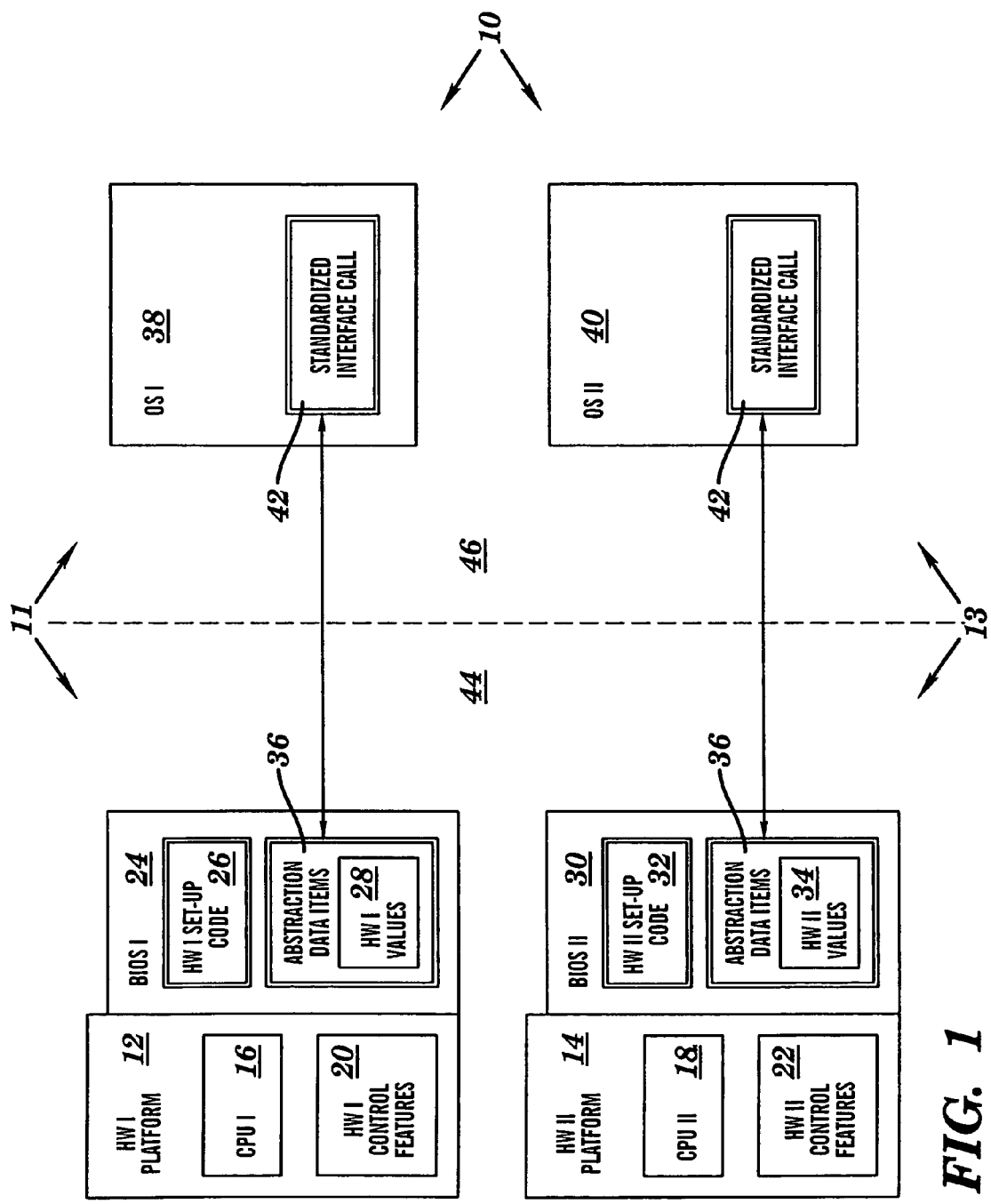
FIG. 1 depicts a development environment for an embedded system in accordance with the present invention.

The present invention provides an efficient system and methodology for simultaneously developing hardware platforms and operating systems for computer systems. To achieve efficiency, the present invention provides a standardized interface between hardware platforms and operating systems. In particular, the invention provides a standardized protocol to be implemented by the bios (basic input/output system) program and the operating system during system design. In the exemplary embodiments described herein, the invention is directed at embedded systems, and more particularly to set-top boxes. However, it should be understood that the invention it not limited to a particular application.

As is known in the art, the bios is a booting program, stored in a memory such as an EPROM, that is executed by the CPU upon system startup. To achieve standardization in the development environment of the present invention, the bios is preferably developed with the hardware platform, and is required to perform two functions. First, the bios is required to "set-up" the bulk of the hardware operations, referred to herein as "control features." The control features may include, for instance, clock registers, ebiu (external bus interface unit) controllers, memory controllers, GPIOs (general purpose I/Os), xilinx configurations, and cache configurations. The bios also loads and executes the operating system.

Secondly, the bios is required to collect and store a standardized set of "abstraction information" in a standardized format. The abstraction information includes a set of pre-defined abstraction data items that are assigned abstraction data values during bios execution. The abstraction data items represent a minimal amount of hardware information required by the operating system to run on related target hardware platforms. The specifications of the abstraction information will not generally change for a given application development environment. For instance, in a set-top box development environment, the abstraction data items will remain the same, regardless of the hardware platform specifications or operating system specifications. Thus, the same protocol is used when new versions of the hardware platform and/or operating system are developed. In an exemplary set-top box embodiment, the abstraction information may comprise the following data items:

- a CPU clock specification;
- a timer clock specification;
- a memory amount;
- a memory start address;
- a system bus clock specification; and
- a hardware MAC (media access control) address.

In a set-top box environment, the above items are sufficient for the needs of any associated operating system. In other words, as long as the operating system designer has access to this standardized set of information, the operating system for any set-top box hardware platform can be designed to be operational without the concern of how to set up the hardware. In accordance with this protocol, the operating system is required to include a standardized interface call to obtain the values of the abstraction information.

The concepts described herein could apply to any development environment. However, different development environments for different types of embedded systems may have slightly different protocols. Specifically, the required abstraction data items may differ from environment to environment. For instance, in an embedded system development environment for an onboard computer in an automobile, a media access control address may not be required, and therefore would not be included as an abstraction data item. Nonetheless, while the specifications of the protocol may differ from one development environment to another, the basic concepts described herein would still apply to each unique development environment.

FIG. 1 depicts an exemplary set-top box development environment 10 involving a first and second generation embedded system 11 and 13. The left side 44 of the dashed line represents the hardware platform development environment, and the right side 46 depicts the operating system development environment. As indicated by the dashed line, the hardware platform and bios may be developed independently from the operating system, as is often the case. However, because a standardized interface protocol is utilized, both the hardware platform and operating system may be designed without knowing the specifications of one another.

With reference to the first embedded system 11, it can be seen that the first hardware platform 12 (HW I Platform) includes a CPU 16 (CPU I) and a set of hardware control features 20 (HW I Control Features), specific to the hardware platform 12. As noted above, typical control features 20 may include clock registers, ebiu (external bus interface unit) controllers, memory controllers, GPIOs (general purpose I/Os), xilinx configurations, and cache configurations. Also included with the hardware platform 12 is a bios program 24 (BIOS I) that is developed with the hardware platform 12. The bios program 24 includes hardware set-up code 26 (HW I Set-up code) specific to the hardware platform 12, and code to collect and store a set of abstraction data items 36. As noted above, the abstraction data items 36 represent a set of standardized information needed by any operating system 38 in the development environment 10. Hardware values 28 (HW I values) are assigned to the data items 36 when the bios 24 is executed. The operating system 38 then obtains the hardware values 28 via a standardized interface call 42.

A second embedded system 13 is shown on the lower half of FIG. 1, which represents an upgraded version of the first embedded system 11, and includes an upgraded hardware platform 14 (HW II Platform) and operating system 40 (OS II). The upgraded hardware platform 14 may include a new CPU 18 (CPU II) and a new set of hardware control features 22 (HW II Control Features). In addition, a new bios 30 (BIOS II) is included having set-up code 32 (HW II Set-up code) specific to the new hardware platform 14. However, to maintain the standardized development protocol, the new bios 30 includes code to collect and store the same abstraction data items 36 as used in the first embedded system 11. Similarly, the second operating system 40 would include the same standardized interface call 42 to obtain the abstraction information. Although the data abstraction items 36 remain unchanged in the upgraded version, the data abstraction values 34 (HW II Values, collected and stored during bios execution) may generally be different in the upgraded version 13. For instance, both versions would collect and store the CPU clock speed as one of the abstraction data items, but the clock speed "value" may be faster in the new version 13. Thus, it can be seen that using the interface protocol of the present invention, hardware platforms and operating systems can be designed independently in an efficient manner.

Figure 2:
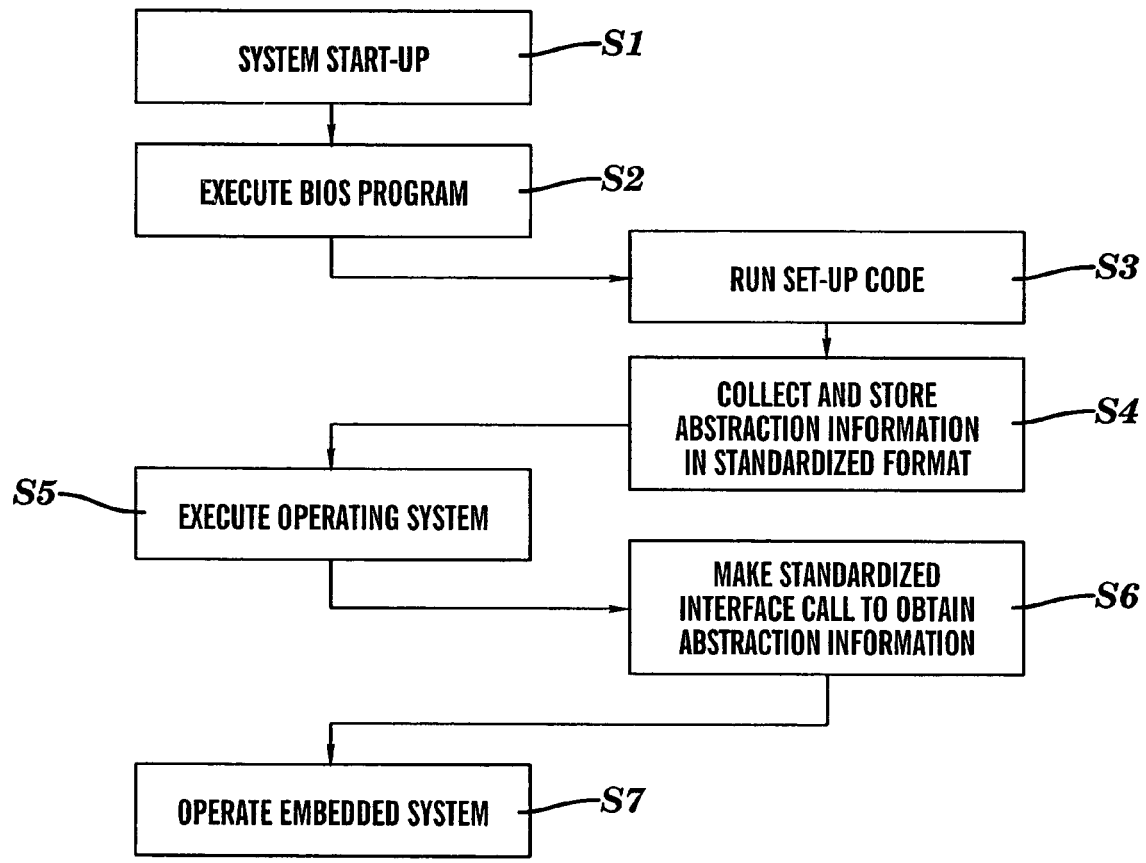
FIG. 2 depicts a flow chart for a method of implementing an embedded system in accordance with the present invention.

FIG. 2 depicts an exemplary operation of an embedded system developed in accordance with the standardized protocol described above. In step S1, system start-up occurs, which causes the bios program to be executed as shown in step S2. The bios program then runs the set-up code in step S3. Below is some exemplary assembly language set-up code:

```
// Tristate for other masters, diable ready time outs
//
    xor    r0, r0, r0
    oris   r1, r0,0x8000
    mtdcr  biucr, r1
//
// Set up default chip interconnect
//
    addis  r0,r0,0x1080
    ori    r0,r0,0x0003
    mtdcr  cic0_cr,r0
    addi   r0,r0,0x0000
    mtdcr  cic0_sel3,r0
    addis  r0,r0,0x004A
    ori    r0,r0,0x0000
    mtdcr  cic0_vcr,r0
//Initialize the Cross-bar switch
    addis  r1,r0,0x0000
    ori    r1,r1,0x0002
    mtdcr  cbscr,r1
// Initialize Bank 0 for 16 bit Flash
//
    xor    r0, r0, r0     //
    mtdcr  brh0, r0       // Set Bus Region Config Hi reg 0
    addis  r1, 0, 0x0001
    ori    r1, r1, 0x8000
    mfdcr  r0, br0        // Get current bank reg 0 settings
    and    r0, r0, r1     // Leave on only the bus width bits
```

-continued

```
        oris    r0,r0,0xF878      // 8 MB of flash r/w 0xFF8xxxxx-0xFFFxxxxx
        ori     r0,r0,0xBFFE      // 16-bit, 8-bit earlier, ready disabled
        mtdcr   br0,r0            // Set Bus Region Config reg 0
//
//----------------------------------------------------------------
// Invalidate i-cache and d-cache TAG arrays.
//----------------------------------------------------------------
        addi    r7, r0,256        // set r7 to # of lines in data cache
                                  // for loop count- romeo has 64 lines
..dcache:
        addi    r6,0,0x0000       // clear GPR 6
        mtctr   r7                // set loop ctr
..dcloop:
        dccci   0, r6             // invalidate line
        addi    r6, r6,0x20       // bump to next line
        bdnz    ..dcloop
..icache:
        addi    r6,0,0x0000       // clear GPR 6
        iccci   0, r6             // invalidates all i-cache
//----------------------------------------------------------------
// Initialize GPIOs to minimum options needed for OpenBIOS
//----------------------------------------------------------------
        addis   r4,r0,0x4006      // GPIO 0
        addi    r0,r0,0x0
        stw     r0,0x0000(r4)
        stw     r0,0x0004(r4)
        addis   r0,r0,0x0040
        ori     r0,r0,0x0548
        stw     r0,0x0008(r4)
//----------------------------------------------------------------
// Configure Minimal Xilinx needed for OpenBIOS to work,
//----------------------------------------------------------------
        addis   r3,r0,0x7204      //Mux base address 0x72040000
        addi    r0,r0,0x40C8
```

-continued

```
        sth     r0,0x0(r3)        //Xilinx reg 0
        addi    r0,r0,0x104D
        sth     r0,0x2(r3)        //Xilinx reg 1
        addi    r0,r0,0x0002
        sth     r0,0x4(r3)        //Xilinx reg 2
        addi    r0,r0,0x0010
        sth     r0,0x8(r3)        //Xilinx reg 4
        addi    r0,r0,0x01D1
        sth     r0,0xa(r3)        //Xilinx reg 5
        addi    r0,r0,0x0008
        sth     r0,0xe(r3)        //Clock Xilinx mux regs 0,1,2, 5.
        /*
         * SDRAM0
         */
        addis   r3,0,0x0000
        addis   r4,0,0x0200
        addis   r5,0,0x2000
        addis   r6,0,0x2200
        addis   r7,0,0x81f0
        addis   r0,0,0
        mtdcr   sdram0_besr,r0    /* reset/unlock besr    */
        ori     r0,r3,0x4010
        mtdcr   sdram0_br0,r0
        ori     r0,r4,0x4010
        mtdcr   sdram0_br1,r0
        mtdcr   sdram0_cr0,r7
        mtdcr   sdram0_cr1,r7
        ori     r0,r7,0x8000      /* enable sdram controller */
        mtdcr   sdram0_cr0,r0
```

Next, in step S4 abstraction information is collected and stored in a standardized format. Exemplary code for performing this operation is as follows:

```
/*--------------------------------------------------------------------+
| Board configuration structure
+--------------------------------------------------------------------*/
#define BOARD_CFG_STRUCT_VER "1.4"
#define BOARD_CFG_EXT_FLAG0 (0x00)
#define BOARD_CFG_EXT_FLAG1 (0xee)
// currently supported vidoe format
#define BOARD_CFG_EXT_VFMT_RGB8 (0x01)
struct board_cfg_data_ext
{
    unsigned char extflag[2];       // BOARD_CFG_EXT_FLAG0,
BOARD_CFG_EXT_FLAG1
    unsigned char debug_boot;       // nonzero means boot with serial port prints
    unsigned char video_buffer_on;  // nonzero means video display is enabled
    unsigned long video_buffer_base;    // video buffer base physical address
    unsigned short video_buffer_xsize;  // video buffer horizontal size in pixels
    unsigned short video_buffer_ysize;  // video buffer vertical size in lines
    unsigned short video_buffer_linesize; // video buffer horizontal line size in bytes
    unsigned short video_buffer_format;   // video buffer format
};
#define ROM_SW_VER_STR_LTH (30-sizeof(struct board_cfg_data_ext))
struct board_cfg_data {
    unsigned char    usr_config_ver[4];
    unsigned char    rom_sw_ver[ROM_SW_VER_STR_LTH]; // still the version string,
but shorter
    struct board_cfg_data_ext cfg_ext;
    unsigned long    mem_size0;
    unsigned long    mem_size1;
    unsigned char    mac_address[6];
    unsigned int     processor_speed;
    unsigned int     bus_speed;
};
```

-continued

```
struct board_cfg_data board_cfg;
void init_board_cfg( )
{
/*------------------------------------------------------------------------+
  | Store board configuration data (board config struct version, rom version,
  | and total dram) for user functions.
  +------------------------------------------------------------------------*/
    strncpy((char *)board_cfg.usr_config_ver, BOARD_CFG_STRUCT_VER, 4);
    strncpy((char *)board_cfg.rom_sw_ver, BIOS_VER_STRING,
ROM_SW_VER_STR_LTH);
    // YYD, add for board config extension
    memset(&board_cfg.cfg_ext, 0, sizeof(struct board_cfg_data_ext));
    board_cfg.cfg_ext.extflag[0] = BOARD_CFG_EXT_FLAG0;
    board_cfg.cfg_ext.extflag[1] = BOARD_CFG_EXT_FLAG1;
    // config the ethernet address
    {
      char *hwaddr = get_current_hw_addr( );
      if(NULL == hwaddr)
      {
        memset(board_cfg.mac_address, 0, 6);
      }
      else
      {
        memcpy(board_cfg.mac_address, hwaddr, 6);
      }
    }
    {
      unsigned long    temp_value;
      unsigned long    Mult, RangeA, RangeB;
      temp_value = ppcMfclkgpcr( );
      RangeB = 8 - ((temp_value >> 8) & 0x7);
      RangeA = 8 - ((temp_value >> 4) & 0x7);
      temp_value = PROC_CLOCK * Mult * RangeA / RangeB ;
      board_cfg.processor_speed = temp_value / 2;
      board_cfg.bus_speed       = temp_value / 8;
    }
    {
      if (!nvread(0,(char *)&confdata,sizeof(confdata))) {
        slprintf("Unable to read configuration data\n");
      } else {
          if(confdata.nvramid[0] != NVRVFY1 || confdata.nvramid[1] != NVRVFY2 ||
            confdata.conf_size != sizeof(confdata) ) {
            // the confdata in NVRAM is not initialized
            memset(&confdata, 0, sizeof(confdata) );
          }
          // in this stage, maybe this one is not yet initialized
          board_cfg.mem_size0 = confdata.sysmem0;
          board_cfg.mem_size1 = confdata.sysmem1;
      }
    }
}
```

Once the abstraction information is collected, the operating system can be executed in step S5. The operating system then makes the standardized interface call to obtain the abstraction information in step S6. Subsequently, the embedded system is operational, as shown in step S7.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A standardized method for developing an embedded system, comprising:
   providing a standardized set of abstraction data items;
   designing a hardware platform together with a bios program, wherein the hardware platform includes a processing unit and a set of control features, and wherein the bios program is stored in a read only memory and includes code for setting up the control features on the hardware platform and for collecting and storing abstraction data values in a standardized format; and
   designing an operating system that includes an interface call to obtain the abstraction data values, and wherein the operating system is designed to be operational on the hardware platform with the abstraction data values,
   wherein the set of abstraction data items represents a minimum number of data parameters necessary to run the operating system on the hardware platform, and
   wherein at least one of the control features is selected from the group consisting of: clock registers, ebiu (external bus interface unit) controllers, memory controllers, GPIOs (general purpose IOs), xilinx configurations, and cache configurations,
   wherein the set of abstraction data items includes: a CPU clock specification; a timer clock specification; a memory amount; a memory start address; a system bus clock specification; and a hardware MAC address.

2. The method of claim 1, comprising the further steps of:
designing a second hardware platform together with a second bios program, wherein the second bios program collects and stores a second set of abstraction data values in the standardized format; and
designing a second operating system for the second hardware platform that includes an interface call to obtain the second set of abstraction data values, and wherein the second operating system is designed to be operational on the second hardware platform with the second set of abstraction data values.

3. The method of claim 1, wherein the hardware platform and bios program are developed together independently from the operating system.

4. The method of claim 1, wherein one of the control features loads and executes the operating system. and a hardware MAC address 5. The method of claim 1, wherein the hardware platform comprises a set-top box.

* * * * *